US011544730B1

United States Patent
Dalton et al.

(10) Patent No.: US 11,544,730 B1
(45) Date of Patent: *Jan. 3, 2023

(54) SYSTEMS AND METHODS FOR PROVIDING REAL-TIME PAYMENT RECOMMENDATIONS AND OFFERS

(71) Applicant: Wells Fargo Bank, N.A., San Francisco, CA (US)

(72) Inventors: Scott T. Dalton, San Francisco, CA (US); Andrew J. Garner, IV, State Road, NC (US); Ramanathan Ramanathan, Bellevue, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/563,799

(22) Filed: Dec. 28, 2021

Related U.S. Application Data

(63) Continuation of application No. 16/886,152, filed on May 28, 2020, now Pat. No. 11,227,301, which is a
(Continued)

(51) Int. Cl.
   *G06Q 30/02*  (2012.01)
   *G06Q 20/10*  (2012.01)
   (Continued)

(52) U.S. Cl.
   CPC ......... *G06Q 30/0215* (2013.01); *G06Q 20/10* (2013.01); *G06Q 20/227* (2013.01);
   (Continued)

(58) Field of Classification Search
   CPC .. G06Q 30/0215; G06Q 20/10; G06Q 20/227; G06Q 20/3221; G06Q 20/3224; G06Q 30/0238; H04W 4/023
   See application file for complete search history.

(56) References Cited

U.S. PATENT DOCUMENTS 7,420,464 B2  9/2008 Fitzgerald et al.
7,644,859 B1  1/2010 Zhu
(Continued)

FOREIGN PATENT DOCUMENTS

EP  2 704 089  3/2014

OTHER PUBLICATIONS

Tao Zhou. An empirical examination of continuance intention of mobile payment services. Decision Support Systems, Jan. 2013, Elsevier, vol. 54, Issue 2, pp. 1085-1091. (Year: 2013).*
(Continued)

*Primary Examiner* — Michael W Schmucker
*Assistant Examiner* — Christopher C Busch
(74) *Attorney, Agent, or Firm* — Foley & Lardner LLP

(57) ABSTRACT

A computer-implemented method for providing a recommended payment account includes receiving location information from a mobile device of a user having one or more payment accounts provided by a financial institution computer system, and determining a location of the user relative to a merchant based on the location information. The method also includes, based on the location of the user relative to the merchant, determining that a payment account recommendation should be sent to the user, including a recommended payment account for use in a payment transaction with the merchant and an incentive offer for using the recommended payment account in the payment transaction, determining the recommended payment account based on an expected financial impact to the user, generating the incentive offer, and sending the incentive offer and the recommended payment account to the mobile device of the user.

20 Claims, 6 Drawing Sheets

Related U.S. Application Data continuation of application No. 14/732,336, filed on Jun. 5, 2015, now Pat. No. 10,699,289.

(51) Int. Cl.
  *G06Q 20/32* (2012.01)
  *H04W 4/02* (2018.01)
  *G06Q 20/22* (2012.01)

(52) U.S. Cl.
  CPC ..... *G06Q 20/3221* (2013.01); *G06Q 20/3224* (2013.01); *G06Q 30/0238* (2013.01); *H04W 4/023* (2013.01)

(56) References Cited

U.S. PATENT DOCUMENTS

| | | |
|---|---|---|
| 7,753,264 B2 | 7/2010 | Shafer et al. |
| 8,027,577 B2 | 9/2011 | Kurosawa |
| 8,140,403 B2 | 3/2012 | Ramalingam et al. |
| 8,260,723 B2 | 9/2012 | Carrott |
| 8,352,327 B2 | 1/2013 | Harris |
| 8,589,247 B2 | 11/2013 | Mesaros |
| 8,608,061 B2 | 12/2013 | Krajicek et al. |
| 8,650,065 B2 | 2/2014 | Carr et al. |
| 8,676,711 B2 | 3/2014 | Gupte |
| 8,756,157 B1 | 6/2014 | Ledbetter et al. |
| 8,805,725 B2 | 8/2014 | Calman |
| 8,930,271 B1 | 1/2015 | Ellis et al. |
| 9,424,571 B1 | 8/2016 | Ellis et al. |
| 2008/0116260 A1 | 5/2008 | Shafer et al. |
| 2009/0018923 A1 | 1/2009 | Chen et al. |
| 2009/0018955 A1 | 1/2009 | Chen et al. |
| 2009/0030787 A1 | 1/2009 | Pon et al. |
| 2011/0153402 A1 | 6/2011 | Craig |
| 2011/0246306 A1 | 10/2011 | Blackhurst et al. |
| 2011/0320345 A1 | 12/2011 | Taveau et al. |
| 2012/0004964 A1 | 1/2012 | Satyavolu et al. |
| 2012/0221420 A1 | 8/2012 | Ross |
| 2012/0253852 A1 | 10/2012 | Pourfallah et al. |
| 2013/0030925 A1 | 1/2013 | Calman et al. |
| 2013/0046626 A1 | 2/2013 | Grigg et al. |
| 2013/0080262 A1 | 3/2013 | Scott |
| 2013/0290172 A1 | 10/2013 | Mashinsky |
| 2013/0297421 A1 | 11/2013 | Nagarajan et al. |
| 2013/0297499 A1 | 11/2013 | Mukherjee |
| 2014/0012704 A1 | 1/2014 | Mizhen et al. |
| 2014/0025540 A1 | 1/2014 | Hendrickson |
| 2014/0040003 A1 | 2/2014 | Kothari et al. |
| 2014/0108124 A1 | 4/2014 | Bous et al. |
| 2014/0129357 A1 | 5/2014 | Goodwin |
| 2014/0136400 A1 | 5/2014 | Espey et al. |
| 2014/0164083 A1 | 6/2014 | Wilkes |
| 2014/0164089 A1 | 6/2014 | Joa et al. |
| 2014/0172559 A1 | 6/2014 | Calman et al. |
| 2015/0066691 A1* | 3/2015 | Ready ............... G06Q 20/363 705/26.8 |
| 2015/0149254 A1 | 5/2015 | Sakamoto |
| 2015/0348042 A1 | 12/2015 | Jivraj et al. |
| 2015/0363816 A1 | 12/2015 | Poglitsch |

OTHER PUBLICATIONS

Tao Zhu. "An empirical examination of continuance intention of mobile payment services." Decision Support Systems, vol. 54, Issue 2, Jan. 2013, pp. 1085-1091. (Year: 2013).*

Clayton-Smith, D. Do It All's loyalty programme—and its impact on customer retention, Managing Service Quality: An International Journal, vol. 6, No. 5, 1996, 6 pages.

Mahatanankoonb et al., Consumer-based m-commerce: exploring consumer perception of mobile applications, Computer Standards & Interfaces, vol. 27, No. 4, Apr. 2005, 11 pages.

Ververidis et al., Mobile Marketing Using a Location Based Service, 1st International Conference on Mobile Business, Jul. 2, 2002, 12 pages.

Zhou, Tao. An empirical examination of continuance intention of mobile payment services. Jan. 2013, Elsevier, vol. 54, Issue 2, pp. 1085-1091. (Year: 2013).

* cited by examiner

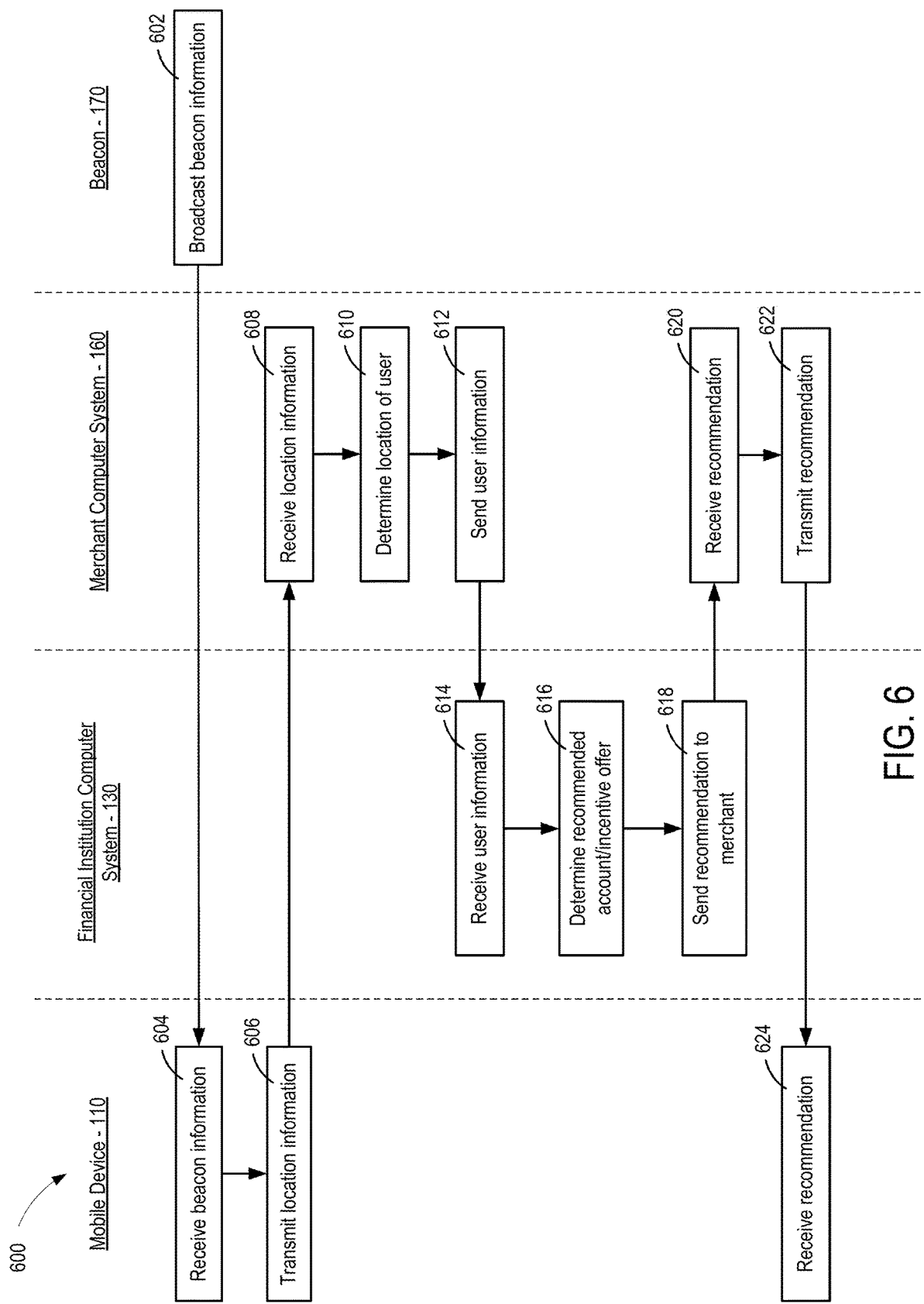

SYSTEMS AND METHODS FOR PROVIDING REAL-TIME PAYMENT RECOMMENDATIONS AND OFFERS

CROSS-REFERENCE TO RELATED APPLICATIONS

This application is a continuation of U.S. patent application Ser. No. 16/886,152 filed on May 28, 2020, which is a continuation of U.S. patent application Ser. No. 14/732,336 filed on Jun. 5, 2015, the entireties of which are hereby incorporated by reference.

TECHNICAL FIELD

The present disclosure relates generally to the field of payment accounts. More specifically, the present invention relates to systems and methods for providing real-time offers and recommendations to account holders regarding use of a payment account to make a payment transaction.

BACKGROUND

Payments for products and services are often completed using credit cards, debit cards, checks or other payment accounts. A user having more than one payment account may choose a particular payment account for initiating a payment based on a variety of factors, including convenience, an available cash balance, an available credit balance, a user reward or offer associated with the payment account, and so on. However, the user may be unable to quickly and efficiently weigh each of the factors involved in choosing a payment account for payment, particularly in real-time. Thus, the user may be unaware of a better offer or reward until after the payment has been made.

Further, the user of the payment accounts often carries some type of mobile handheld electronic device, such as a cellular phone, smart phone, mobile handheld wireless e-mail device, personal digital assistant, or portable gaming device. The mobile device can be used to access payment account information and receive various communications from an associated financial institution. However, the information provided to the user of the mobile device may not be to sufficient to enable the user to select, in real time, the most beneficial payment account for making a payment.

SUMMARY

One embodiment of the present disclosure relates to a computer-implemented method performed by one or more processors of a financial institution computer system. The method includes receiving, by the financial institution computer system, location information from a mobile device of a user having one or more payment accounts provided by the financial institution computer system, determining, by the financial institution computer system, a location of the user relative to a merchant based on the location information, based on the location of the user relative to the merchant, determining, by the financial institution computer system, that a payment account recommendation should be sent to the user, including a recommended payment account for use in a payment transaction with the merchant and an incentive offer for using the recommended payment account in the payment transaction, determining, by the financial institution, the recommended payment account from the one or more payment accounts based on an expected financial impact to the user, generating, by the financial institution computer system, the incentive offer, and sending, by the financial institution computer system, the incentive offer and the recommended payment account to the mobile device of the user.

Another embodiment of the present disclosure relates to a financial institution computer system. The financial institution computer system includes a server system that includes a processor and instructions stored in non-transitory machine-readable media. The instructions are configured to cause the server system to receive location information from a mobile device of a user having one or more payment accounts provided by the financial institution computer system, determine a location of the user relative to a merchant based on the location information, based on the location of the user relative to the merchant, determine that a payment account recommendation should be sent to the user, including a recommended payment account for use in a payment transaction with the merchant and an incentive offer for using the recommended payment account in the payment transaction, determine the recommended payment account from the one or more payment accounts based on an expected financial impact to the user, generate the incentive offer, and transmit the incentive offer and the recommended payment account to the mobile device of the user.

Another embodiment of the present disclosure relates to a computer-implemented method performed by one or more processors of a financial institution computer system to promote use of a payment account provided by the financial institution computer system. The method includes identifying, by the financial institution computer system, a preferred merchant of a user having one or more payment accounts provided by the financial institution computer system, wherein the preferred merchant is identified based on a user profile of the user, and wherein the user profile is based at least in part on past transactions of the user using the one or more payment accounts, determining, by the financial institution computer system, a location of the user based on a location of a mobile device of the user, based on the location of the user, determining, by the financial institution computer system, that the user is within a predetermined distance of the preferred merchant, determining, by the financial institution computer system, a recommended payment account from the one or more payment accounts for making a payment at the preferred merchant, and generating, by the financial institution computer system, an incentive offer for using the recommended payment account to make the payment at the preferred merchant and transmitting the recommended payment account and the incentive offer to the mobile device.

Another embodiment of the present disclosure relates to a computer-implemented method performed by one or more processors of a financial institution computer system to promote use of a payment account provided by the financial institution computer system. The method includes receiving, by the financial institution computer system, a request from a mobile device of a user to send a payment account recommendation to the mobile device when the mobile device is proximate a preferred merchant of the user, wherein the user has one or more payment accounts provided by the financial institution computer system, generating, by the financial institution computer system, a user profile for the user based on user preferences and past transaction information of the user received from the mobile device, receiving, by the financial institution computer system, beacon discovery information from the mobile device, determining, by the financial institution computer system, that the mobile device is proximate the preferred merchant based on receipt of the beacon discovery information, upon determining that the mobile device is proximate the preferred merchant, determining, by the financial institution computer system, a recommended payment account from the one or more payment accounts for making a payment to the preferred merchant, wherein the recommended payment account is determined based on the user profile, and sending, by the financial institution computer system, the recommended payment account to the mobile device.

BRIEF DESCRIPTION OF THE FIGURES

The details of one or more implementations are set forth in the accompanying drawings and the description below. Other features, aspects, and advantages of the disclosure will become apparent from the description, the drawings, and the claims, in which:

FIG. 6 is a schematic diagram of another payment account recommendation process that may be implemented using the system shown in FIG. 1, according to an example embodiment.

DETAILED DESCRIPTION

Before turning to the figures which illustrate example embodiments, it should be understood that the application is not limited to the details or methodology set forth in the following description or illustrated in the figures. It should also be understood that the phraseology and terminology employed herein is for the purpose of description only and should not be regarded as limiting.

Figure 1:
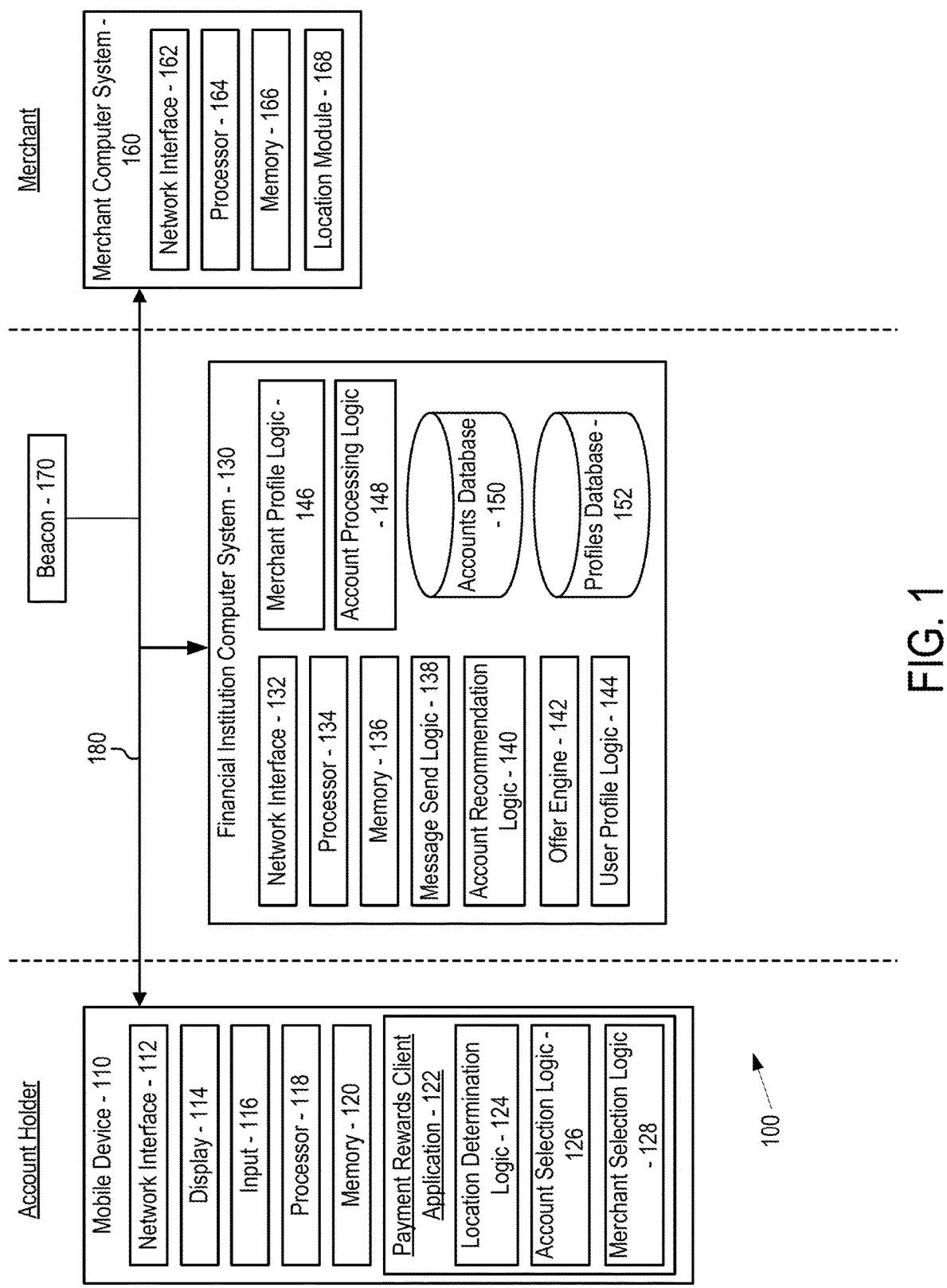
FIG. 1 is a schematic diagram of a payment rewards system, according to an example embodiment.

Referring to FIG. 1, a payment rewards system 100 is shown, according to an example embodiment. The payment rewards system 100 may be used to recommend (e.g., promote, incentivize, etc.) use of a particular payment account (i.e., financial account or other financial product) to make a payment based on the financial health of a user (i.e., an account holder). The recommendations may be based on financial information received from the user, including transaction information and user preferences. The recommended payment accounts may be provided to the user based on proximity of the user (e.g., a mobile device of the user) to preferred merchants and service providers of the user. The payment rewards system 100 may also be used to provide incentives for use of a particular payment method. For instance, the payment rewards system 100 may be at least partially operated by a financial institution. As part of the payment rewards system 100, the financial institution may offer incentives (e.g., discounts, rewards, promotions, etc.) to the user for use of a payment account provided by the financial institution to make a payment.

The payment rewards system 100 may include, among other systems, a mobile device 110 (i.e., an account holder computer system), a financial institution computer system 130, and a merchant computer system 160. In an example embodiment, the systems are each owned and operated by a separate entity. In other embodiments, two or more systems may be combined to operate as a single system, or two or more systems may be owned or operated by a single entity. The systems may include a computer system (e.g., one or more servers each with one or more processing circuits) configured to execute instructions, send and receive data stored in memory, and perform other operations to implement the operations described herein or associated with logic or processes shown in FIG. 2.

The mobile device 110, the financial institution computer system 130, and the merchant computer system 160 may each include a processor and memory. The processors may be implemented as application specific integrated circuits (ASICs), one or more field programmable gate arrays (FPGAs), a group of processing components, or other suitable electronic processing components. The memory may be one or more devices (e.g., RAM, ROM, Flash memory, hard disk storage, etc.) for storing data and/or computer code for completing and/or facilitating the various processes described herein. The memory may be or include non-transient volatile memory, non-volatile memory, and non-transitory computer storage media. The memory may include data base components, object code components, script components, or any other type of information structure for supporting the various activities and information structures described herein. The memory may be communicably connected to the processor and include computer code or instructions for executing one or more processes described herein.

The mobile device 110, the financial institution computer system 130, and the merchant computer system 160 may communicate through a network 180. The network 180 may be a single communication network configured to communicatively connect each of the systems, or the network 180 may include a plurality of networks each connecting two or more systems. The network 180 may be a wired or wireless network, including one or more of the Internet, a cellular network, Wi-Fi, Wi-Max, a proprietary banking network, Bluetooth®, near filed communication (NFC), and so on. Further, the network 180 may refer to more than one method of communication that may be utilized by the systems to interact as part of the payment rewards system 100.

The mobile device 110 may be used by an individual user (e.g., a business owner or employee, a consumer, and so on) to access the network 180 and communicate with the financial institution computer system 130. The mobile device 110 may be, for example, a cellular phone, smart phone, mobile handheld wireless e-mail device, personal digital assistant, portable gaming devices, or other suitable device configured to access the network 180. In an example embodiment, the user of the mobile device 110 is an account holder having a relationship with the financial institution computer system 130. For instance, the financial institution computer system 130 may provide one or more payment accounts (i.e., financial accounts or other financial products) to the account holder. The financial institution computer system 130 may also enable the account holder to add or cancel payment accounts, to modify (e.g., increase) lines of credit, to apply for loans, and so on.

Figure 3:
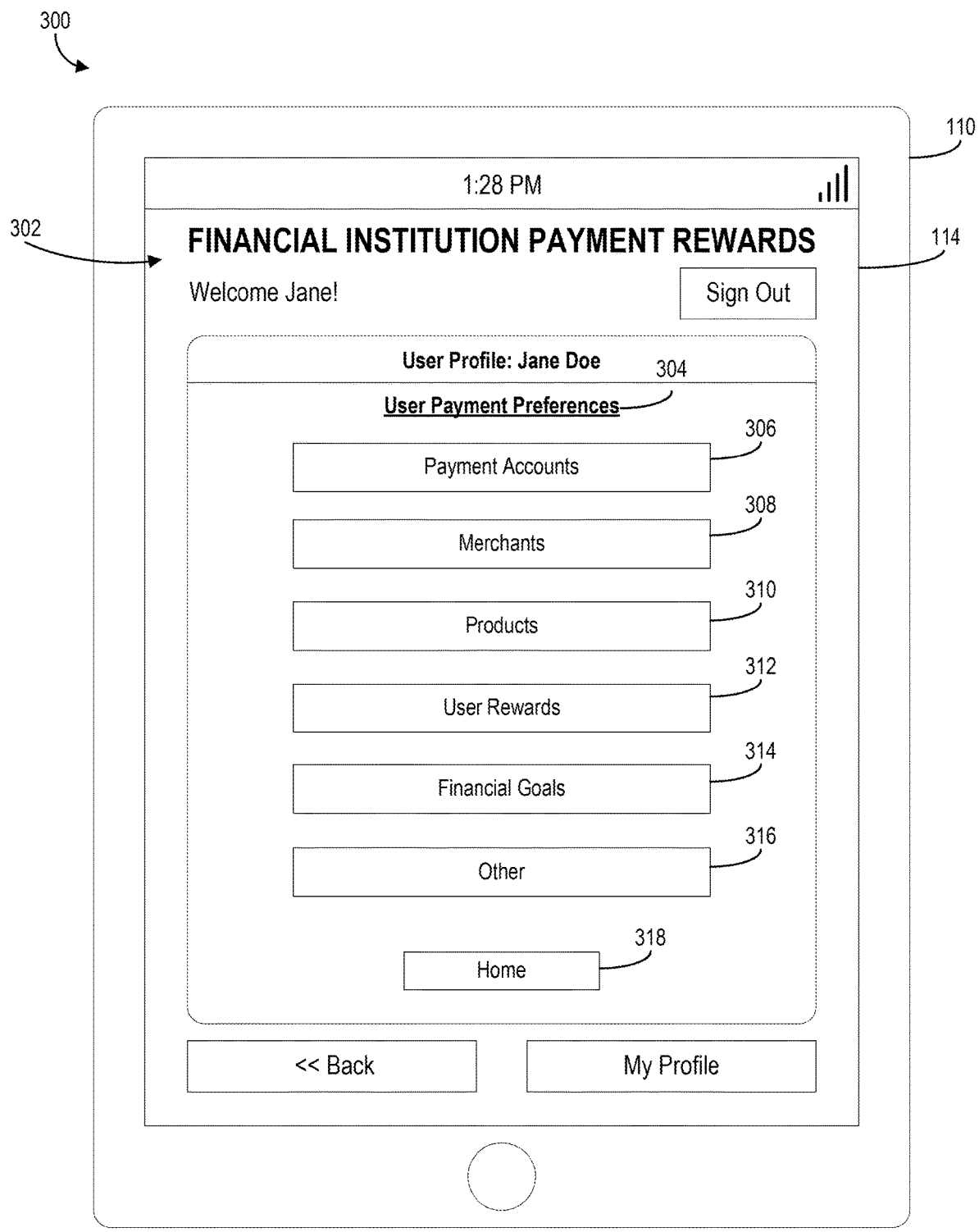
FIG. 3 is a user interface that may be presented on a display of the mobile device shown in FIG. 1 to enable a user to configure payment preferences, according to an example embodiment.
Figure 4:
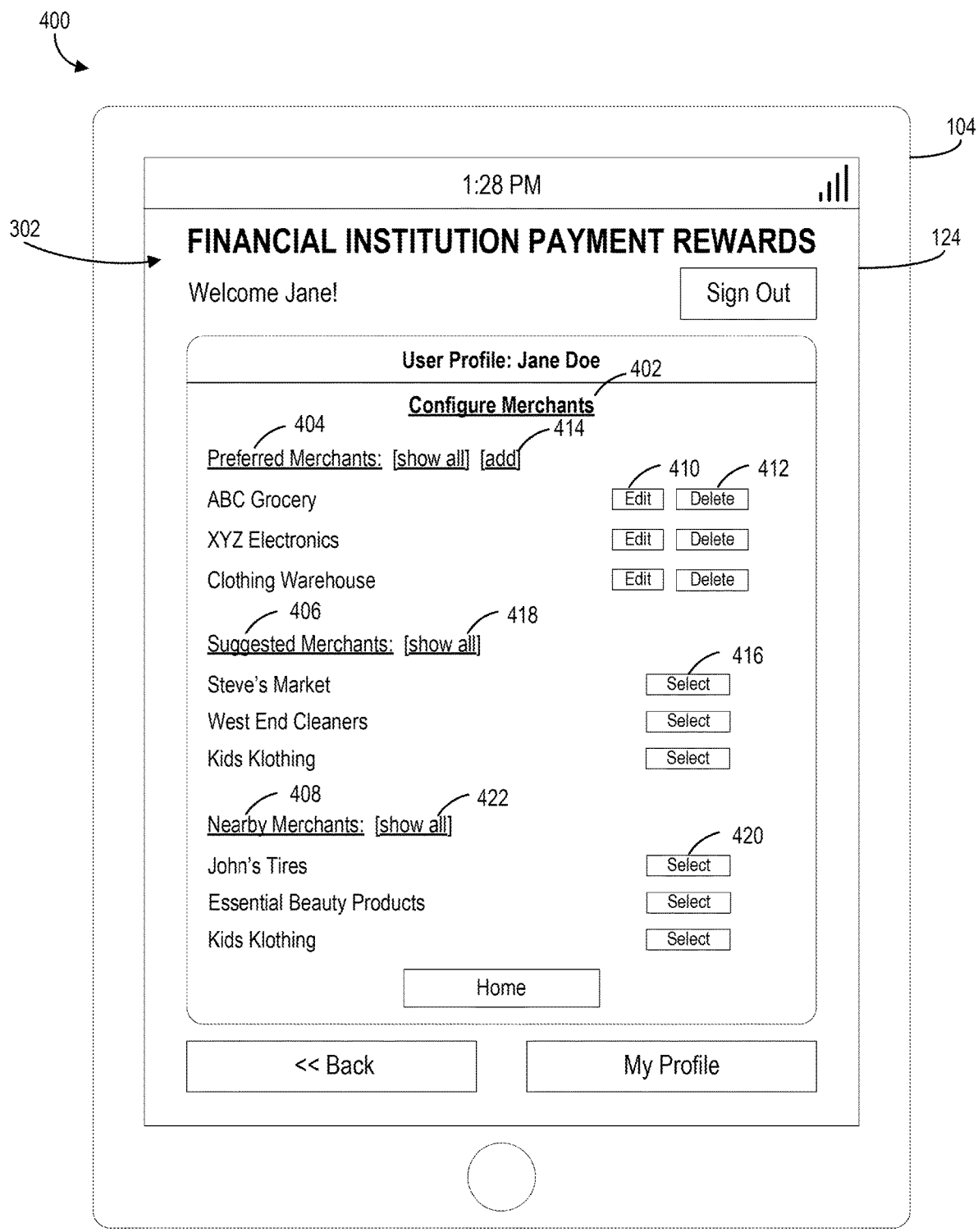
FIG. 4 is a user interface that may be presented on the display of the mobile device shown in FIG. 1 to enable the user to configure preferred merchants, according to an example embodiment.

The mobile device 110 includes a network interface 112, a display 114, and an input 116. The network interface 112 may be a wireless network interface that communicates with a wireless communication protocol (e.g., 802.11a/b/g/n, Bluetooth®, ZigBee®, CDMA, GSM, LTE, WiMax, NFC, etc.). The network interface 112 may include, for example, program logic that connects the mobile device 110 to the network 180. As described in greater detail below, the mobile device 110 may receive and display screens including account information, user profile information, rewards offers, payment method recommendations, and so on. Such screens may be used to prompt the user to provide information regarding a user payment, including a selected merchant or payment account for processing the payment, as well as financial information that may be used to build and update a financial health profile for the user. Such screens are presented to the user via the display 114. Examples of such screens are shown in FIGS. 3 and 4. The input 116 may be used to permit the user to initiate account access and to facilitate receiving requested information from the user. In some arrangements, the display 114 and input 116 are integrated in a touchscreen display. As will be appreciated, in addition to or instead of the mobile device 110, users may also be provided with the ability to access the payment rewards system 100 using another type of computer (e.g., a desktop or laptop computer executing browser software, an in-store point-of-sale (POS) computer system, etc.) to perform the operations described herein as being performed by the mobile device 110.

The mobile device 110 also includes a processor 118 and a memory 120. The memory 120 includes programming modules and logic that, when executed by the processor 118, control the operation of the mobile device 110. For instance, the mobile device 110 also includes a payment rewards client application 122 (e.g., mobile banking application, mobile wallet application, web browser, a merchant-specific application linked to the financial institution, etc.), which may be stored on memory 120. The payment rewards client application 122 may comprise program logic executable by the mobile device 110 to implement at least some of the functions described herein. As will be appreciated, the level of functionality that resides on the mobile device 110 as opposed to the financial institution computer system 130 or the merchant computer system 160 may vary depending on the implementation. The payment rewards client application 122 may simply be a web browser that is configured to receive and display mobile web pages received from the financial institution computer system 130 (e.g., web pages prompting the user to provide payment information, web pages displaying payment rewards offers, etc.).

The payment rewards client application 122 includes location determination logic 124, which may be stored on memory 120. The location determination logic 124 may be executed to determine a location of the mobile device 110. A user may opt-in to using the location determination logic 124 to receive targeted incentive offers for preferred merchants, as described below. In an example embodiment, the location determination logic 124 utilizes locator beacons (e.g., iBeacons) such as beacon 170 to determine the location of the mobile device 110 relative to a merchant. In an example embodiment, beacon 170 is located at or near a preferred merchant. The beacon 170 is configured to broadcast discovery signals and/or identification information that can be detected by the mobile device 110 within a predetermined range of the merchant. In this embodiment, the location determination logic 124 is configured to determine the location of the mobile device 110 (and thus the user or account holder) based on the information broadcast by the beacon 170 and detected by the mobile device 110. For instance, the payment rewards client application 122 may be configured to recognize the information transmitted by the beacon 170. The payment rewards client application 122 may be triggered to open or start based on the beacon information received at the mobile device 110. The beacon 170 and the broadcasted information are described in further detail below in reference to the merchant computer system 160.

In various embodiments, the location determination logic 124 may also utilize a satellite (GPS) sensor at the mobile device 110 or nearby cellular towers to determine the location coordinates of the mobile device 110. The satellite or cellular information may be used independent of the beacon discovery information or to supplement location information determined based on the received beacon discovery information. The location determination logic 124 may also utilize NFC technology to determine the location coordinates of the mobile device 110. For instance, the mobile device 110 may include an NFC tag (e.g., smart tag, information tag, etc.) enabling two-way communication with another mobile device or an in-store NFC device (e.g., an NFC reader) to approximate the location of the mobile device 110. The NFC tag may include a stored program for enabling two-way communication with another NFC-enabled device.

The location determination logic 124 may also utilize an indoor positioning system (IPS) that can communicate precise location and movement information relative to an enabled device (i.e., the mobile device 110). For instance, an IPS may include various anchor nodes (i.e., nodes with known positions) positioned within a merchant location and configured to communicate with the mobile device 110. The anchor nodes are configured to either actively locate the mobile device 110 (e.g., a smart tag on the mobile device 110) or provide ambient location or environmental context for the mobile device 110 to be sensed. The IPS may utilize various optical, radio, and/or acoustic technology to locate the mobile device 110. The IPS may be configured to measure a distance between the anchor node and the associated mobile device 110 to determine the location of the mobile device 110 relative to a specific floor within the merchant location, a location on the merchant floor, or to determine movement of the mobile device 110 within the merchant location.

The payment rewards client application 122 also includes account selection logic 126 and merchant selection logic 128, which may be executed to perform various functions of the payment rewards client application 122. The account selection logic 126 allows a user to choose a payment account for making a payment to an individual or entity such as the merchant computer system 160. The user of the mobile device 110 may select a default payment account that is used to make payments. In an example embodiment, the default payment account is based on a payment account recommended by the financial institution computer system 130. The merchant selection logic 128 allows the user to select a nearby merchant for conducting a transaction. The merchant selection logic 128 may also determine preferred merchants. The preferred merchants may be selected by the user or determined based on user preferences or transaction history.

It should be noted that the payment rewards client application 122 can refer to any application or web interface provided to the user via the financial institution computer system 130. In one embodiment, the application 122 may be a mobile banking application configured to allow the user to securely access the financial institution website and interact with various accounts held by the user. In this embodiment, the payment rewards system 100 described herein is accessed via a payment rewards area of the mobile banking site or application. The mobile banking application may also enable the user to perform various other tasks or functions that could otherwise be performed using the financial institution website or at a branch location. Once a recommended payment account for a transaction is provided to the user (e.g., via the mobile device 110), the user may initiate the payment using a traditional payment method (e.g., bank card, check, cash, credit card, ACH, etc.).

In another embodiment, the application 122 may be a mobile wallet application configured to allow the user to make payments from accounts provided by the financial institution computer system 130 using the mobile device 110. In this embodiment, the user is able to interact with the financial institution computer system 130 as described herein by accessing a payment rewards section of the mobile wallet application. Further, when a recommendation is provided for a particular payment account, the user may make a payment with the recommended payment account using the mobile device 110. For instance, the mobile wallet application may generate a payment code that may be scanned, transmitted via NFC, or otherwise provided at a merchant point of sale to initiate a payment using one of the user payment accounts.

In other embodiments, the functions described herein with regard to the payment rewards client application 122 may be performed absent the payment rewards client application 122. For instance, the functions described herein may be performed via an online banking area associated with the financial institution computer system 130. The mobile device 110 may also communicate with the financial institution computer system 130 via text message, instant message, or another type of communication method available via the mobile device 110.

The financial institution computer system 130 is configured to provide to the user of the mobile device 110 one or more financial accounts for use in making a payment (i.e., payment accounts). The payment accounts may include any type of financial account or other product that may be used to make a payment, such as credit cards or debit cards, checking accounts, gift cards, pre-paid cards, ACH payments, and the like. Information related to the payment accounts is stored in accounts database 150. The financial institution computer system 130 is configured to recommend a particular payment account for use in making a payment when the user is in proximity to one or more merchants. The recommendation may be based on a financial health of the user, including user preferences, transaction history, account(s) status, contemplated purchase(s), and any other information received or determined by the financial institution computer system 130. The financial institution computer system 130 is also configured to provide incentive offers to the user based on the payment accounts. For instance, the financial institution computer system 130 may promote a particular payment account (e.g., the recommended payment account) by providing an incentive offer applicable to any payments made using the payment account. The incentive offer may also be based on a particular purchase category (e.g., drugs, food, gas, etc.) or merchant category (e.g., supermarket, gas station, drugstore, etc.).

The financial institution computer system 130 includes a processor 134 and memory 136. In some arrangements, the financial institution computer system 130 includes a plurality of processors. The memory 136 stores programming modules that, when executed by the processor 134, control the operation of the financial institution computer system 130. For instance, the financial institution computer system 130 includes message send logic 138, offer engine 142, account recommendation logic 140, user profile logic 144, merchant profile logic 146, and account processing logic 148. Such logic may be implemented in a machine (e.g., one or more networked computer servers) comprising machine-readable media (e.g., memory 136) having instructions stored therein which are executed by the machine to perform the operations described herein. For instance, such logic may be implemented and executed to recommend a particular payment account for a transaction, as well as generate and present an incentive offer to the user of the mobile device 110.

The financial institution computer system 130 also includes a network interface 132 that allows the financial institution computer system 130 to communicate data to and from other devices and systems (e.g., mobile device 110, merchant computer system 160, etc.) described herein via the network 180. The network interface 132 may include, for example, program logic that connects the financial institution computer system 130 to the network 180.

The message send logic 138 may be executed to determine when to send a payment message (i.e., a payment account recommendation and/or an incentive offer) to the mobile device 110. For instance, the message send logic 138 may be configured to anticipate a payment by the user and cause a payment message to be sent to the mobile device 110 when the payment is anticipated. In various embodiments, the message send logic 138 may anticipate a payment by the user based on any of a location of the mobile device 110 (i.e., the user), a relative movement of the mobile device 110, occurrence of one or more events related to the mobile device 110, or based on other information available to the financial institution computer system 130 (e.g., via the mobile device 110). For instance, the message send logic 138 may cause a payment message to be sent to the mobile device 110 when the mobile device 110 (i.e., the user) is near a preferred merchant, product, or service. In other embodiments, the message send logic 138 may determine that a payment message should be sent to the mobile device 110 in order to prompt a payment by the user, or based on any other factors described herein.

In some embodiments, the message send logic 138 is configured to determine a location of the mobile device 110 (e.g., a relative location). The message send logic 138 may determine the location of the mobile device 110 based on information received from the mobile device 110 (i.e., by the financial institution computer system 160). For instance, the relative location of the mobile device 110 may be received from the mobile device 110 (i.e., the location determination logic 124) via based on signals or other information received from the beacon 170. In one embodiment, the mobile device 110 receives discovery information (e.g., unique identifiers, sub-identifiers, signal strength, etc.) from the beacon 170 and determines (e.g., via the payment rewards client application 122) a distance from the mobile device 110 to the beacon 170 based on the discovery information. The mobile device 110 may also determine a relative distance to a merchant or a product or service at the merchant based on the discovery information. The mobile device 110 may also utilize information from the financial institution computer system 130 and the merchant computer system 160 to determine any of the above.

In various embodiments, the mobile device 110 may also send location information to the financial institution computer system 130 based on a satellite (GPS) sensor stored on the mobile device 110, or based on cellular data. The message send logic 138 may also utilize location information received via the indoor positioning system (IPS), barcodes, or NFC technology. For instance, the message send logic 138 may utilize any of the above location information to determine a precise location of the mobile device 110, the relationship of that location to a specific merchant, service or product, a specific location of the mobile device 110 within a merchant location, as well as movement of the mobile device 110 within the merchant location. The financial institution computer system 130 may receive the location information from the mobile device 110 continuously, or in response to a request.

In an example embodiment, the message send logic 138 determines a location of the mobile device 110 (i.e., the user) relative to a preferred merchant and sends a payment message to the mobile device 110 based on proximity of the mobile device 110 to the preferred merchant (i.e., when the mobile device 110 is proximate the preferred merchant). For instance, the recommendation may be sent when the mobile device 110 is within a predetermined distance (e.g., one mile) or time (e.g., five minutes walking or driving time) of a merchant location, or when the mobile device 110 is at or within a merchant location. In an example embodiment, receipt of the beacon discovery information at the mobile device 110 provides an indication of the relative distance between the mobile device 110 and a merchant location. In other embodiments, the location of the mobile device 110 and the merchant may be determined separately and a distance calculated based on the separate technologies and determinations. The location of the merchant may be provided, for instance, by location module 164 at the merchant computer system 160, or determined based on publicly available location information.

Similarly, the message send logic 138 may send a payment message to the mobile device 110 based on the location of the mobile device 110 (i.e., the user) relative to a preferred product or service. For example, the payment message may be sent when the mobile device 110 is within a predetermined distance of, or at or within, a merchant location having the product or service available for sale. The payment message may also be sent when the mobile device 110 is within a predetermined distance of the product or service while within the merchant location. The product or service may be identified by the user as preferred or otherwise selected by the user. For instance, the user may identify the product or service using the mobile device, such as by manually inputting the product or service, or scanning a barcode or NFC tag related to the product. A preferred product or service may also be determined by the message send logic 138 based on information stored in a user profile (e.g., past transactions, savings goals, user preferences, etc.). The location of the product or service may be determined based on information received from the merchant computer system 160 or stored in a merchant profile. In other embodiments, locator beacons may be located at or near a particular product or service, and the mobile device 110 may receive associated beacon discovery information when the mobile device 110 is proximate the product or service.

The message send logic 138 may also send a payment message based on a duration of time spent by the user at or near a merchant location, or at or near a product or service located within the merchant location. For instance, based on location information received from the mobile device 110 or the IPS implementation of the merchant, the message send logic 138 may determine a duration of time that the user has been at or near (e.g., within) a merchant location. The time duration may be calculated based on the location information received from the mobile device 110 and/or the merchant computer system 160. When the time duration at or near a particular location reaches a predetermined threshold (e.g., 15 minutes, 30 minutes, etc.), the message send logic 138 may send a payment message to the mobile device 110, which may include an offer incentive to use a recommended payment account. Similarly, the message send logic 138 may send a payment message to the mobile device 110 when the mobile device 110 is within a predetermined distance from a product or service for a predetermined duration of time. The payment message may also include an offer that is set to expire after a period of time, which may or may not be equal to the predetermined duration of time.

The message send logic 138 may also send a payment message to the mobile device 110 based on the occurrence of an event, such as an event which typically precipitates a purchase (i.e., a payment). For instance, the message send logic 138 may send a payment message to the mobile device 110 based on an upcoming birthday, anniversary, or other gift-related date associated with the user. Any incentive offer may then be related to a merchant or product associated with the recurring event, such as the purchase of a gift for a birthday. The date of the recurring event may be provided as an input by the user or otherwise stored in the user profile. Similarly, the message send logic 138 may also send an incentive offer to the mobile device 110 based on recurring purchases or payments, such as an oil change or a periodic loan payment.

The message send logic 138 may also send a payment message to the mobile device 110 based on a request received from the user. The user request may include a selected merchant, a selected or desired product or service, an amount of the purchase, and other information related to a payment. For instance, the user may request a payment message related to a selected merchant. Any incentive offer provided may then be related to the selected merchant and provide a nearby location for the selected merchant, as well as directions from the location of the mobile device 110 to the selected merchant. The user may also request a payment message for a specific product or service, or type of product or service. The payment message may then include a list of merchants within a predetermined distance of the mobile device 110 where the product is available.

The account recommendation logic 140 may be executed to select the recommended payment account to send to the user as part of the payment message. The recommended payment account may be selected from the payment accounts that are currently held by the user, including those that are provided or otherwise managed by the financial institution computer system 130. The account recommendation logic 140 may also select a new payment account that may be available to the user but has not yet been created (e.g., opened, applied for, etc.). In an example embodiment, the recommended payment account is selected based on an expected financial impact to the user, which may be determined based on the user's overall financial health. For instance, the account recommendation logic 140 may recommend the payment account having the most positive expected financial impact to the user based on the payment. The expected financial impact to the user may be represented by a financial impact score for each payment account, which may be based on a net value associated with the payment for each payment account. In this embodiment, the account recommendation logic 140 may determine the recommended payment account based on the payment account having the best financial impact score (i.e., the greatest value to the user).

It should be noted that the recommended payment account in many cases may not be the payment account alternative having the lowest associated cost at the time of the payment. In addition to determining the short term financial impact of the transaction, the financial institution computer system 130 is also configured to base the recommended payment account on various financial goals provided by the user, including savings, retirement, and other long-term goals. Thus, the financial institution computer system 130 may recommend a payment account that provides benefits related to the user's long-term financial goals rather than selecting the payment method having the lowest up-front cost. The financial institution computer system 130 is configured to recommend in real-time (i.e., prior to making a payment) a payment account for a transaction based on the overall financial health of the user, which may include various user preferences, current account balances and interest rates, financial goals of the user, transaction history, budget considerations, and any other information provided by the user or the merchants, or determined by the financial institution computer system 130.

Where the recommended payment account is determined based on the financial health of the user, the financial health may be based on any information provided by the user or otherwise determined by the financial institution computer system 130 and related to the user. The financial health of the user is intended to provide an account for the current financial state of the user, as well as more holistic measures such as financial goals, savings plans, life events, and the like. The financial institution computer system is configured to determine an expected financial impact based on each selectable payment account. Again, the expected financial impact is intended to account for not only the immediate economic consequences of the payment, but also the effect of the payment on the financial goals and other preferences of the user. The expected financial impact may be determined for the user based on using each of the one or more payment accounts held by the user and provided by the financial institution computer system 130 to make the payment. The expected financial impact may be determined based on the user profile or the merchant profile, or based on any other information related to the associated user and merchant. The expected financial impact may also be determined based on payment information, such as a payment amount and payment timing. The information may be utilized to project (e.g., estimate, calculate) a net financial impact for the user based on a payment to the merchant using a selected payment account.

The account recommendation logic 140 may determine the financial impact score for each payment account based on information associated with any of the user (i.e., the user profile), the merchant (i.e., the merchant profile), the transaction (e.g., payment amount, payment timing, etc.), and the product or service. For instance, the account recommendation logic 140 may include an algorithm that assigns a particular weight to each item of information that is associated with the payment. The account recommendation logic 140 may weight each factor at least partially according to input received from the user. For instance, for each payment account, the account recommendation logic 140 may assign a weight to factors related to the user, such as an account balance, available credit, a loan balance, a risk profile of the user such as a credit score, an interest rate associated with a user account, past transactions, budgetary goals, upcoming bills, or other financial information available to the financial institution computer system 130. Again, the user may choose to place less emphasis on any current or future payment amounts in order to meet certain financial goals or plan for future events. The account recommendation logic 140 may also be configured to assign a weight to factors associated with the merchant, as well as the transaction. Based on the weighted factors, the account recommendation logic 140 may determine a financial impact score for each payment account of the user. The score may provide a numerical indication of a negative or positive impact to the user, including the impact to each of the financial goals of the user. The recommended payment account may be based solely on the advancement of one or more financial goals of the user, even if selecting the recommended account will have a negative economic impact in the short or long-term.

The recommended payment account may also be a new account offered by the financial institution computer system 130. For instance, the account recommendation logic 140 may determine a projected financial impact for a payment account offered by the financial institution computer system 130 based on information related to the user and the financial institution computer system 130. The financial institution computer system 130 may then offer the new account to the user as the recommended payment account. Where the new account is a credit-based account, the financial institution computer system 130 may provide a credit limit or interest rate such that the new credit-based account has a better financial impact than any other payment account of the user. The financial institution computer system 130 may also set the financial parameters of any other type of new account in order to provide a better alternative for making the payment. Upon selection of the new account to make a payment, the financial institution computer system 130 may open the new account for the user and provide the new account to the user to make the payment. In other embodiments, the recommended payment account may also be based on a modification to a current payment account, such as reducing the associated interest rate, increasing a credit limit, or modifying the payment schedule.

The offer engine 142 may be executed to generate and send an incentive offer to a user of the mobile device 110. The incentive offer may be intended to encourage use of the recommended payment account provided by the financial institution computer system 130. The incentive offer may include requirements related to the merchant, the payment account, and the user that must be met in order to receive the promised incentive. In an example embodiment, an incentive offer is contingent upon use of a payment account provided by the financial institution computer system 130 (e.g., the recommended payment account), and the payment must be made to a specified merchant. The incentive offer may include a discount, rebate, rewards offer, or any other benefit that may be provided to the user via the financial institution computer system 130. The incentive offer may provide an additional incentive to an already recommended payment account, or the incentive offer may be provided so that a payment account provided by the financial institution is best for the financial health of the user.

The offer engine 142 may generate an incentive offer based on, among other factors, any of the user, the merchant, and the product or service. The incentive offer is intended to incentivize use of a particular payment account by the user, such as a payment account provided by the financial institution computer system 130. For instance, the incentive offer may be generated based on information stored on a user profile, which may include information provided by the user as an input (i.e., user preferences), as well as information collected based on the user payment accounts. The user profile may include account balances, available credit, a risk profile, credit history, past transactions, rewards balances, user preferences, and so on. As an example, if a user rewards balance for a particular payment account is relatively close to a rewards goal, the incentive offer may include a rewards offer intended to help the user achieve the rewards goal. As another example, if the balance on a credit card account is relatively high, the incentive offer may include an offer of a reduced interest rate or a credit line increase based on use of the recommended payment account. The incentive offer may also include an overall discount on the cost of the transaction (e.g., a percentage reduction, total reduction, etc.), issuance of a new credit line (e.g., with a lower interest rate than other payment accounts) based on use of a new credit account, or any other rewards or discounts that may be provided to the user by the financial institution computer system 130. Again, the specific type of incentive offer provided to the user is determined based on information related to the user, including information stored in a user profile, user preferences, past transactions, or any other user information described herein.

The incentive offer may also be generated by the offer engine 142 based on a merchant profile, which may include available merchant rewards or discount programs, as well as information regarding any relationships between the financial institution computer system 130 and the merchant. For instance, the incentive offer may incorporate rewards available via the merchant for certain purchases or additional discounts based on an agreement between the financial institution computer system 130 and the merchant. Similarly, the incentive offer may be based on a type of product or service being purchased. For instance, the incentive offer may incorporate any rewards or discounts that are available via a vendor or provider of a particular product, including any agreements negotiated with the financial institution computer system 130. The incentive offer may also include discounts or other benefits for future purchases of similar products.

In some embodiments, an incentive offer may also be provided by the merchant computer system 160. For instance, the message send logic 138 and/or the offer engine 142 may be stored at the merchant computer system 160 and configured to execute in a similar manner to provide merchant offers to the user at the mobile device 110. The merchant offers may be sent to the mobile device 110 via the beacon 170. For instance, the mobile device 110 may receive beacon discovery information that is transmitted by the beacon 170. Based on the beacon discovery information, the payment rewards client application 122 may be triggered to communicate with the financial institution computer system 130 to request an offer from the merchant. The financial institution computer system 130 may then request a targeted merchant offer from the merchant computer system 160 that may be tied to the recommended payment account and/or offer incentive provided by the financial institution computer system 130. The merchant offers may be interpreted by the payment rewards client application 122 and provided to the user as an alphanumeric message. The merchant offer may be based on a relationship between the merchant and the user, or between the merchant and the financial institution. The financial institution computer system 130 may also receive an indication of the merchant offer and incorporate the offer into the payment account recommendation.

In some embodiments, the user may be prompted to provide (via the mobile device 110) details of a potential purchase, including the type of product or service and an amount for the purchase. This information may then be utilized by the account recommendation logic 140 and/or the offer engine 142 to determine the recommended payment account and/or the incentive offer. For instance, the incentive offer may include a discounted loan or credit line based on the amount of the transaction. The payment message, including the incentive offer, may also be directed to a particular merchant based on a discount or incentive that is available for the product or service at that merchant. For instance, a discounted loan or credit line may be provided to the user based on a relationship between the financial institution and the merchant.

The user profile logic 144 is configured to generate and update a profile for each user. The user profile may be based on information provided by the user (e.g., via the mobile device 110). The user may provide user preferences, such as preferred payment accounts, preferred merchants or merchant locations, preferred products or vendors, and so on. The user may also provide financial goals, such as savings goals, account limits, debt reduction goals, and the like. The user may also provide identifying information, such as address, gender, age, marital status, family information, and so on. The user-provided information may be used to generate a profile for the user and categorize the user (i.e., by demographic) in order to provide targeted products and services to the user.

The user profile logic 144 may also incorporate transaction-related information into the user profile. For instance, the user profile logic 144 may collect transaction data for the user and determine the user's preferred payment accounts, merchants, and products or services based on the transaction data. The transaction data may also be used to determine the timing and payment amount of various purchases. For instance, the transaction data may be used to determine any recurring payments made by the user, such as bill payments and loan information, including the timing and payment amount of the payments.

The merchant profile logic 146 is configured to generate and update a profile for each merchant. The merchant profile may be based on information provided by the merchant (e.g., the merchant computer system 160). For instance, the merchant may provide merchant preferences, including preferences regarding the type of payment account used to facilitate a payment to the merchant. The merchant may also provide current incentives or discounts that are available based on the payment type, the product or service, or other factors. The merchant profile logic 146 may also receive any information received at the financial institution computer system 130 and incorporate the information into the merchant profile. For instance, the merchant profile may include transaction information involving the merchant. The merchant profile logic 146 may use the transaction information to determine transaction-related preferences for the merchant.

The account processing logic 148 may be executed to process the payment from the user to the merchant. The account processing logic 148 may also be configured to send updated information to the user profile logic 144 and the merchant profile logic 146 based on the payment. The account processing logic 148 may also be used to open a new payment account for the user, such as when the recommended payment account is a new account.

The financial institution computer system 130 also includes accounts database 150. The accounts database 150 may store details regarding financial institution accounts. In particular, the accounts database 150 may store each financial transaction that occurred. Each financial transaction may include the user, the amount of the transaction, and the merchant. The accounts database 150 may store the information according to each user. The accounts database 150 may be configured to send transaction and other account-related information to the user profile logic 144 so that the user profile logic 144 may update the user profile. The offer engine 142 and the account recommendation logic 140 may also receive information from the accounts database 150 in order to perform the operations described herein.

The financial institution computer system 130 also includes profiles database 152. The profiles database 152 may store information regarding the user (e.g., the account holder) and the merchant, including user profiles and merchant profiles. The profiles database 152 may store information useful for generating incentive offers and advertising that are selected specifically for the user and for determining a recommended payment account for use in making a payment to a merchant. The logic described above may access the profiles database 152 to perform any of the operations described herein.

The merchant computer system 160 includes network interface logic 162 and a location module 164, which may be implemented in a machine (e.g., one or more networked computer servers) comprising machine-readable media having instructions stored therein which are executed by the machine to perform the operations described herein. The network interface logic 162 may include, for example, program logic that connects the merchant computer system 160 to the network 180. The location module 164 may provide location information to the financial institution computer system 130. The location information may include a location of the merchant computer system 160 or a merchant location associated with the merchant computer system 160. The location module 164 may also be configured to interact with the mobile device 110 to receive merchant location information stored within the beacon transmission data (e.g., identifying information for the merchant) and process any information received from the mobile device 110 via the beacon 170 to determine a location of the merchant.

Figure 2:
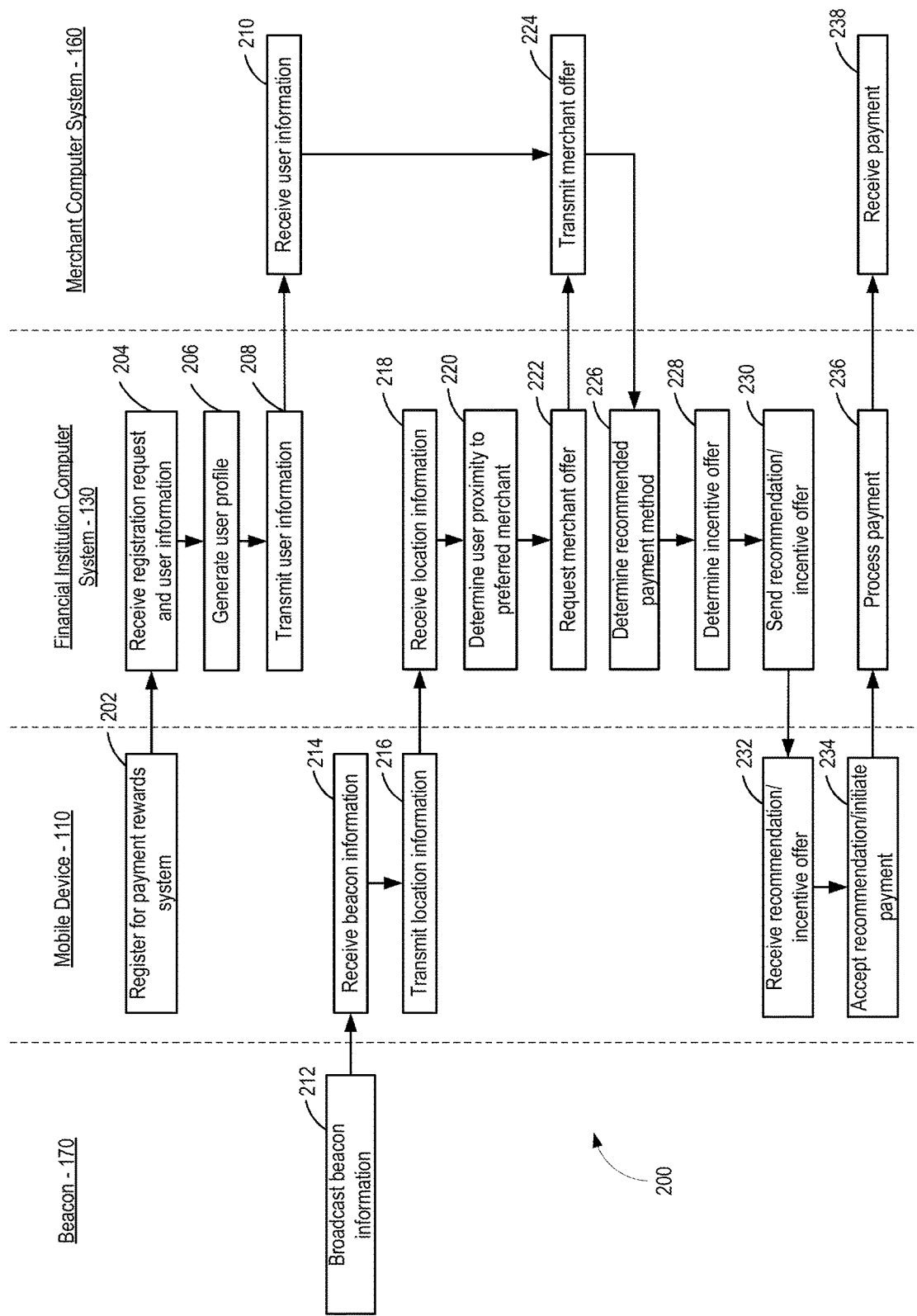
FIG. 2 is a schematic diagram of a payment rewards process that may be implemented using the system shown in FIG. 1, according to an example embodiment.

Referring now to FIG. 2, a process 200 is shown for providing payment rewards, according to an example embodiment. The process 200 may be performed using the payment rewards system 100 shown in FIG. 1. In particular, the process 200 may be performed using any or all of the mobile device 110, the financial institution computer system 130, and the merchant computer system 160 shown in FIG. 1, including any stored applications (e.g., mobile applications specific to the financial institution or the merchant), logic or other components of the systems and devices that are described in further detail herein. The process 200 may include determining a relative location of a user via the mobile device 110, recommending a payment account for making a payment based on a financial status of the user, and providing an incentive offer for the user make a payment using a payment account provided by the financial institution computer system 130 (e.g., the recommended payment account).

At 202 of the process 200, the user and the mobile device 110 are registered with the payment rewards system 100. For instance, the user may "opt into" the payment rewards service provided by the financial institution computer system 130 by sending a message to the financial institution computer system 130 via the payment rewards client application 122 of the mobile device 110. The user may register the mobile device 110 in response to a request or an offer received from the financial institution computer system 130.

At 204, the registration request is received from the mobile device 110 by the financial institution computer system 130. The financial institution computer system 130 may also receive additional information from the user, including various user preferences. For instance, the financial institution computer system 130 may request additional information from the user when the mobile device 110 is registered. The additional information may include preferred merchants or products, preferred payment accounts, preferred user rewards, user financial goals, or other information relevant to the user's financial health. For example, FIG. 3 shows a user interface 300 that may be presented to the user on the display 114 of the mobile device 110 when the user is accessing the customer's website 302. As shown on the user interface 300, the user can log into the website 302 and access a user profile at area 304, including various user payment preferences. The user can access and modify payment account preferences by interacting with button 306, preferred merchants by interacting with button 308, preferred products and services by interacting with button 310, user rewards preferences by interacting with button 312, financial goals by interacting with button 314, and/or other user preferences described herein by interacting with button 316. When the user interacts with button 318, the user is taken to the home page of the financial institution website (or an associated application of the financial institution).

At 206, a profile for the user is generated by the financial institution computer system 130. The user profile may be generated by the user profile logic 144 and stored at the profiles database 152. The user profile may be generated based on any of the information described herein and related to the user. The user profile may be based on personal information, such as contact information and user demographics (e.g., age, gender, income, marital status, etc.). The user profile may also be based on financial information related to the user, such as past transactions, account balances, outstanding loans, credit lines, credit scores and other risk profiles, and interest rates. The financial information may also include financial goals of the user, such as budgetary goals, savings goals, account balance limits, and debt reduction goals. The user profile may also be based on user preferences, such as preferred payment accounts, merchants, and products. The user information utilized by or stored within the user profile may be provided by the user (e.g., via the mobile device 110) or the merchant computer system 160, received as part of a payment transaction, or determined by the user profile logic 144 based on other user information.

The generated user profile may include a financial status of the user, which may be determined by the user profile logic 144 based on other user information. The financial status of the user is intended to reflect a "financial health" of the user at any time. The financial status may be determined based on any of the information described above, which may include account balances associated with the user, recent spending behavior of the user, and budgetary concerns of the user. The user profile logic 144 may be configured to update the financial status of the user based on information as it is received. The user profile logic 144 may also be configured to determine one or more user preferences based on transaction information and other information provided by the user, as well as to categorize the user based on user information in order to provide targeted products and services.

The generated user profile may also include one or more preferred merchants. Preferred merchants may be selected by the user or determined by the financial institution computer system 130 based on the user information. For instance, a preferred merchant may be based on transactional data, including a number of recent transactions, an amount of money paid to the merchant, etc. At 208, the user information is sent to any preferred merchants (i.e., the merchant computer system 160) by the financial institution computer system 130. For instance, the financial institution computer system 130 may notify the merchant computer system 160 that the merchant has been selected by the user as a preferred merchant. At 210, the merchant computer system 160 receives the user information. The merchant computer system 160 may then provide offers to the user based on this information. For instance, if the user and/or the mobile device 110 are known to the preferred merchant, the merchant computer system 160 may detect the mobile device 110 and send a message to the mobile device 110 that includes the offer. The mobile device 110 may also notify the financial institution computer system 130 that the user is at or near the preferred merchant, and the financial institution computer system 130 may then provide this information to the merchant computer system 160. The merchant computer system 160 could then send a message to the user, such as by triggering the payment rewards client application 122 stored on the mobile device 110.

For example, FIG. 4 shows a user interface 400 that may be presented to the user on the display 114 of the mobile device 110 when the user is accessing the customer's website 302 (e.g., the payment rewards client application 122). As shown on the user interface 400, the user can access a preferred merchants area 402 (e.g., by interacting with button 308 of the user interface 300), including a display of selected preferred merchants 404, suggested merchants 406, and nearby merchants 408. The user can edit or delete a preferred merchant by interacting with buttons 410 and 412, respectively. The user can also add a preferred merchant by interacting with link 414. For instance, the user may be able to search for merchants based on location, transaction information, user rewards information, or based on any other information provided herein. The user can select one of the suggested merchants to be added to the preferred merchants by interacting with an associated button 416. The suggested merchants may be provided based on a user profile. For instance, the suggested merchants may be suggested to the user by the financial institution computer system 130 based on past transactions or other account information. The user may see all of the suggested merchants by interacting with link 418. The user can select one of the nearby merchants to be added to the preferred merchants by interacting with an associated button 420. The nearby merchants may be a listing of the merchants closest to the mobile device 110 at any time that are not already selected as a preferred merchant. The nearby merchants may also be determined by the financial institution computer system 130 based on other factors, such as past transactions or other user preferences. The user may see all of the nearby merchants by interacting with link 422.

At 212, the beacon 170 broadcasts beacon discovery information within a predetermined radius. The beacon 170 may be operated by the merchant computer system 160 or the beacon 170 may be operated independently of the merchant computer system 160 as a separate computer system having at least a network interface and a processor. The beacon 170 may include a plurality of beacons programmed to transmit various primary identifiers and sub-identifiers that are recognizable by the mobile device 110 for various types of triggers. For instance, a plurality of beacons may be positioned throughout a merchant location in order to transmit specific information (e.g., product-based, location-based, etc.) that is receivable by the mobile device 110. The beacon discovery information may be configured to only be received by users of the payment rewards system 100. The beacon discovery information may also be targeted specifically to the mobile device 110. In an example embodiment, the locator beacons (e.g., the beacon discovery information) are unique to the merchant so that the merchant may be identified based on the beacon discovery information. The beacons may also be unique within a merchant location, such as based on a sub-identifier transmitted by the beacon.

At 214, the beacon discovery signals are received by the mobile device 110. Receipt of the beacon discovery signals provides an indication that the mobile device 110 (and thus the user) is within a predetermined distance of the preferred merchant. The beacon information, including any primary or secondary beacon identifiers, may be interpreted by the mobile device 110. For instance, the payment rewards client application 122 stored on the mobile device 110 may be configured to recognize and/or interpret the beacon identifiers to determine the information transmitted by the beacon(s). The interpreted information may trigger various actions described herein, including by the client application 122, at the financial institution computer system 130, and/or at the merchant computer system 160. At 216, the mobile device 110 transmits the beacon discovery information and/or any other location information to the financial institution computer system 130. For instance, the mobile device 110 may send GPS, WiFi, or cellular information to the financial institution computer system 130 in addition to, or in lieu of, the beacon discovery information. At 218, the location information is received by the financial institution computer system 130.

At 218, the location information is received by the financial institution computer system 130. The financial institution computer system 130 may receive location information from the mobile device 110 upon the user opting in to receive recommendations and rewards via the payment rewards system 100. At 220, the financial institution computer system 130 determines a location of the mobile device 110 (i.e., location of the user) relative to a merchant (i.e., the preferred merchant) based on the location information received from the mobile device 110. The financial institution computer system 130 may determine when the user is proximate to the preferred merchant, such as when the mobile device 110 is located within a predetermined distance of a location of the preferred merchant. The system 130 may also determine when the user is at or within the merchant location. The financial institution computer system 130 determines the user's proximity to a preferred merchant in order to determine when the user is likely to make a payment. The financial institution computer system 130 may then provide payment recommendations and other financial advice based on the user's financial information prior to the user making a payment and in real-time.

In other embodiments, the financial institution computer system 130 may similarly determine a location of the user relative to a product or service. The product or service may be determined by the financial institution computer system 130, either based on a selection from the user or determined based on the user profile and other user-related information. The location of the product or service may be provided by the merchant computer system 160, the user, or otherwise received by the financial institution computer system 130.

The user location may also be used to determine a duration of time spent at or within a merchant location, or proximate a particular product or service. Again, the financial institution computer system 130 is intended to determine when the user is likely to make a payment based on proximity to preferred products and/or services.

At 222, the financial institution computer system 130 requests a merchant offer from the preferred merchant. The financial institution computer system 130 may notify the merchant computer system 160 of the user's proximity to the location of the preferred merchant, and thus the user's likelihood to make a purchase, and request that the merchant computer system 160 provide an additional incentive to the user. At 224, the merchant computer system 160 transmits a merchant offer to the financial institution computer system 130. The merchant offer may be any type of reward or discount intended to encourage the user to make a purchase with the merchant. The merchant offer may be based on a relationship between the preferred merchant and the user or the financial institution computer system 130. In one embodiment, the user has a rewards account with the preferred merchant and the merchant offer may include additional rewards or discounts associated with the rewards account. In another embodiment, the financial institution computer system 130 may "pass on" an incentive based on a relationship between the preferred merchant and the financial institution computer system 130, such as a discounted transaction fee agreement or other bulk discount or promotion.

In some embodiments, the financial institution computer system 130 is configured to generate a profile for the merchant based on information that is provided by the merchant computer system 160 and/or the mobile device 110. The merchant profile may be generated by the merchant profile logic 146. The merchant profile may also be generated based on any of the information described herein and related to the merchant. The merchant profile may include information provided by the merchant, such as any incentives (e.g., rewards, discounts) associated with the merchant. For instance, the merchant profile may include incentives based on a relationship between the merchant and the user, or based on a relationship between the merchant and the financial institution computer system 130. The merchant profile may include location information for the merchant, in situations where the merchant computer system 160 is associated with a plurality of merchant locations. The merchant profile may also include financial information for the merchant, including information related to payment transactions processed via the financial institution computer system 130. The merchant profile logic 146 may use any of the merchant-related information to generate the merchant profile, and may also utilize the information to generate one or more metrics associated with the merchant or to determine merchant preferences such as preferred payment methods.

At 226, a recommended payment account is determined by the financial institution computer system 130. The recommended payment account may be determined by the account recommendation logic 140. In an example embodiment, the recommended payment account is determined based on the financial health of the user, including the expected financial impact of the payment. For instance, the account recommendation logic 140 may recommend the payment account having the most positive expected financial impact to the user based on the payment. The expected financial impact to the user is represented by a financial impact score for each payment account. In this embodiment, the account recommendation logic 140 may determine the recommended payment account based on the payment account having the best financial impact score. The recommended payment account may also be a new account or an existing payment account with modified terms.

The account recommendation logic 140 may determine a financial impact score for each payment account based on information associated with any of the user (i.e., the user profile), the merchant (i.e., the merchant profile), the transaction (e.g., payment amount, payment timing, etc.), and the product or service. For instance, the account recommendation logic 140 may include an algorithm that assigns a particular weight to each item of information that is associated with the payment. The account recommendation logic 140 may weight each factor at least partially according to input received from the user. For instance, for each payment account, the account recommendation logic 140 may assign a weight to factors related to the user, such as an account balance, available credit, a loan balance, a risk profile of the user such as a credit score, an interest rate associated with a user account, past transactions, budgetary goals, upcoming bills, or other financial information available to the financial institution computer system 130. Again, the user may choose to place less emphasis on any current or future payment amounts in order to meet certain financial goals or plan for future events. The account recommendation logic 140 may also be configured to assign a weight to factors associated with the merchant, as well as the transaction. Based on the weighted factors, the account recommendation logic 140 may determine a financial impact score for each payment account of the user. The score may provide a numerical indication of a negative or positive impact to the user, including the impact to each of the financial goals of the user. The recommended payment account may be based solely on the advancement of one or more financial goals of the user, even if selecting the recommended account will have a negative economic impact in the short or long-term.

At 228, an incentive offer is generated by the financial institution computer system 130. The incentive offer is intended to encourage the user to use a particular payment account to make a payment. For instance, the financial institution computer system 130 may provide an incentive for the user to user a payment account provided by the financial institution computer system 130. The incentive offer may be provided to encourage use of the recommended account (i.e., to encourage the user to make a payment to the preferred merchant using the recommended account). The incentive offer may also be provided so that a selected payment account that would not otherwise be recommended absent the incentive offer (e.g., an account provided by the financial institution) becomes the recommended account. For instance, the incentive offer may lower the transactional cost associated with using the selected payment account such that the selected payment account is best for the overall financial health of the user. The incentive offer may be generated by the offer engine 142. The incentive associated with the incentive offer may be any benefit that may be provided to the user by the financial institution computer system 130, a merchant, or another party associated with the payment. For instance, the incentive may include a discount or other promotion, a rewards offer, a rate reduction, or other benefit related to the payment and/or a payment account of the user. In an example embodiment, the incentive offer is generated based on a preferred merchant and a known user having one or more payment accounts provided by the financial institution computer system 130. In this embodiment, the incentive offer is generated by the offer engine 142 such that the offer may be redeemed only as part of a payment to the preferred merchant from one of the identified payment accounts.

The incentive offer may be generated based on the user profile in order to provide a targeted incentive to the user. For instance, the incentive may include a user rewards bonus where the user is relatively close to achieving a reward or where the user has indicated a preference for user rewards. As another example, the incentive may include a reduced interest rate on a credit card account where the user has indicated a budgetary goal of lowering the balance of the credit card account. As another example, the incentive may include a future discount on a particular product or merchant based on an indicated user preference.

At 230, the financial institution computer system 130 sends the incentive offer and the recommended payment account to the mobile device 110. In an example embodiment, the incentive offer and recommended payment account are sent via a text message to the mobile device 110. In another embodiment, the incentive offer and the recommended payment account may be presented via the display 114 using the payment rewards client application 122. In other various embodiments, the incentive offer and the recommended payment account are sent to the user via an instant message, direct message, e-mail, or another type of electronic message that may be sent by the financial institution computer system 130 and received by the mobile device 110 of the user.

In an example embodiment, the incentive offer and the recommended payment account are sent to the user based on a location of the user (i.e., the mobile device 110) relative to a location of the preferred merchant. For instance, a text message may be sent to the mobile device 110 that states that the user is within close proximity to an identified preferred merchant and provide the incentive offer and the recommended payment account for payment to the preferred merchant. The message to the user may also state an associated financial impact to the user, including any financial goals that may be positively impacted based on the payment. Similarly, in other embodiments, the incentive offer and recommended payment account may be sent to the user based on a location of the user relative to a product or service. The incentive offer and recommended payment account may also be presented to the user based on a request of the user or based on the occurrence of an event. For instance, the event may be a birthday or anniversary associated with the user, or the event may be a recurring purchase or payment determined based on the user profile.

At 234, the recommended payment account and/or the incentive offer are accepted by the user and mobile device 110 initiates a payment to the preferred merchant. At 236, the financial institution computer system 130 processes the payment using the recommended payment account and based on the incentive offer. The payment may be processed by the account processing logic 148 at the financial institution computer system 130. The account processing logic 148 may calculate a payment amount by applying the incentive offer to the transaction. The account processing logic 148 may then cause the payment amount to be transmitted from a payment account of the user to the merchant computer system 160. The account processing logic 148 may also adjust any user accounts associated with the payment or the incentive. For instance, the account processing logic 148 may adjust a user rewards account where the incentive offer was related to user rewards. The account processing logic 148 may also adjust the payment account based on the payment amount. At 238, the merchant computer system 160 receives the payment via the financial institution computer system 130.

Figure 5:
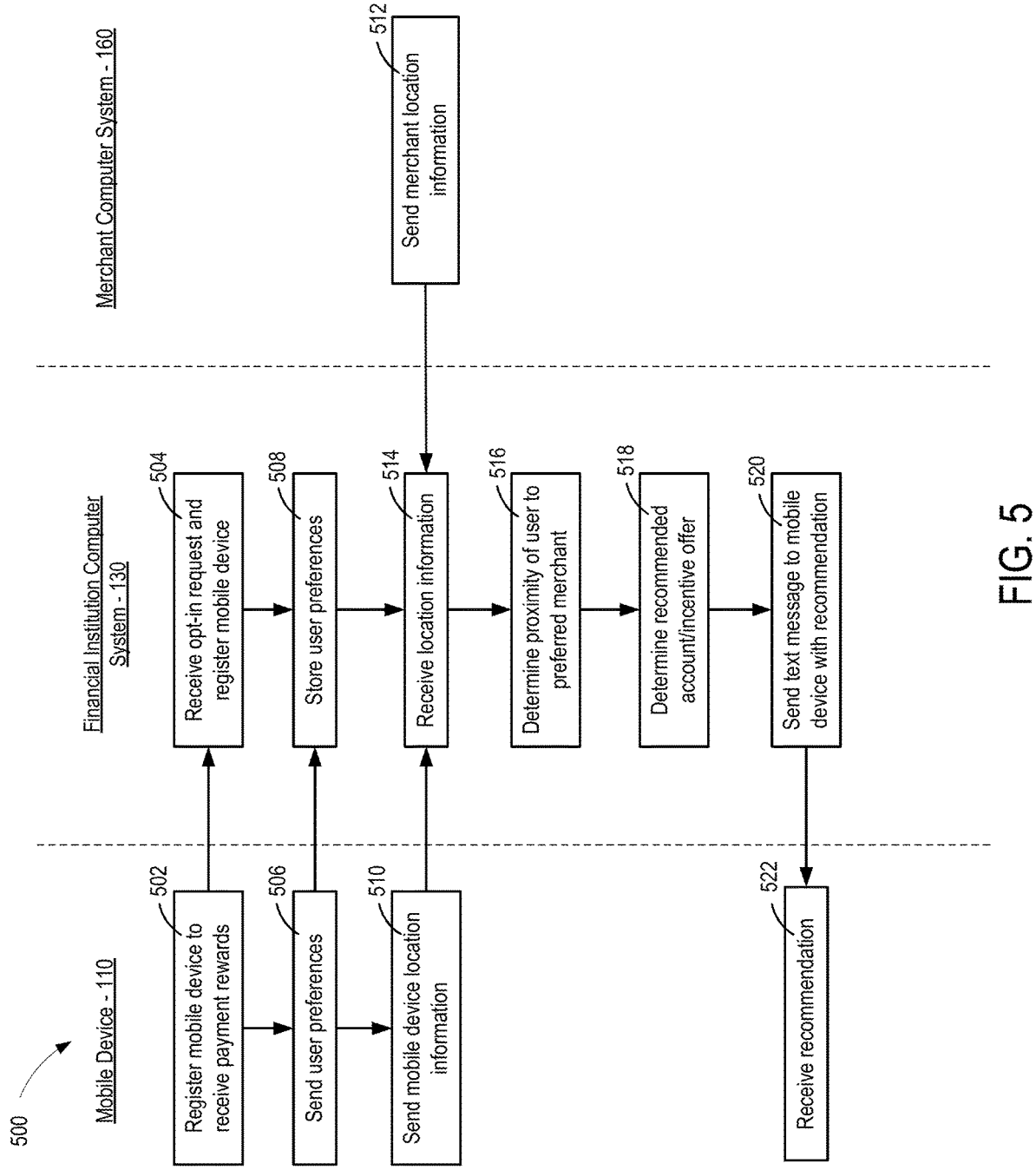
FIG. 5 is a schematic diagram of a payment account recommendation process that may be implemented using the system shown in FIG. 1, according to an example embodiment.

Referring now to FIG. 5, a process 500 is shown for providing a recommended payment account, according to an example embodiment. The process 500 may be performed using the payment rewards system 100 shown in FIG. 1, including the mobile device 110, the financial institution computer system 130, and the merchant computer system 160 shown in FIG. 1, and all logic or other components of the systems and devices that are described in further detail herein. The process 500 may include determining a location of a user relative to a preferred merchant via the mobile device 110, recommending a provided payment account for the user to make a payment to the merchant based on a financial status of the user, and providing an incentive offer for the user to make the payment using the recommended payment account.

At 502 of the process 500, the user opts in for a payment rewards product or service (i.e., the payment rewards system 100) provided by the financial institution computer system 130, by registering the mobile device 110 of the user. The mobile device 110 may be registered using the payment rewards client application 122, for instance. At 504, the financial institution computer system 130 receives the "opt-in" request and registers the mobile device 110 to the user. By registering the mobile device 110, the user agrees to receive messages (e.g., alerts) when in close proximity to preferred merchants or service providers.

At 506, the user, via the mobile device 110, sends user preferences to the financial institution computer system 130. The user preferences may be provided to the financial institution computer system 130 via the payment rewards client application 122, as is shown by way of example in FIG. 3. The user preferences may include preferred merchants, products, or services, preferred payment accounts, financial goals of the user, preferred user rewards, or any other preferences that are described herein or that may be relevant to the payment rewards system 100. In particular, the user selects favorite (e.g., preferred) merchants and service providers for receiving payment recommendations. The user may select the preferred merchants based on the user's transaction history, which may include payments using any payment accounts provided by the financial institution computer system 130, including any credit and debit cards, ACH payments, or check payments. The user may also make the selections by reviewing transactions for accounts provided by other financial institutions. The transaction information may be provided by the financial institution computer system 130 via the client application 122. At 508, the financial institution computer system 130 stores the user preferences and associates the user preferences with the user and the mobile device 110. For instance, the financial institution computer system 130 may generate a user profile for the user and the preferences may be stored in a user profile.

At 510, the mobile device 110 sends mobile device location information to the financial institution computer system 130. In an exemplary embodiment, the location information is determined based on a satellite sensor stored on the mobile device 110. At 512, the merchant computer system 160 sends merchant location information to the financial institution computer system 130. At 514, the financial institution computer system 130 receives the location information from the user and the merchant. At 516, the financial institution computer system 130 determines that the mobile device 110 is in close proximity to the merchant based on the location information.

At 518, the financial institution computer system 130 determines a recommended account for making a payment and an incentive offer for using the recommended account. The financial institution computer system 130 determines the recommended account and the incentive offer after determining that the mobile device 110 is in close proximity with the preferred merchant. The financial institution computer system 130 determines the recommendation based on the financial health of the user, which is determined based on the preferences provided by the user. The financial institution computer system 130 is configured to determine the payment account provided by the financial institution computer system 130 that will have the most positive impact on the user's overall financial health, taking into account not only the immediate economic impact of the payment but also the long-term financial goals of the user. The financial institution computer system 130 may also determine an incentive offer for using the recommended payment account based on the user preferences. For instance, the user may select a preferred type of user rewards and the incentive offer may be based on the user rewards preferences of the user. Where a payment method provided by another financial institution may produce a more positive impact on the financial health of the user, the incentive offer may be determined in order to improve the impact of using a payment account provided by the financial institution computer system 130. The incentive offer may be intended to improve the financial health impact of using a payment account provided by the financial institution computer system 130 so that use of this payment account is recommended or preferred (i.e., according to the expected financial health impact to the user) over any payment accounts held by the user and not provided by the financial institution computer system 130.

At 520, the financial institution computer system 130 sends a text message to the mobile device 110 that includes the recommendation. For example, the text message may state "Hello Ms. Doe, you are within close proximity to one of your identified stores, Big Clothing, located at XX Street, Chandler, Ariz. If you plan to shop there today, "Financial Institution" will offer a 10% discount made on all of your purchases if you utilize a "Financial Institution" payment method. Based on your current financial health, we recommend using your "Financial Institution" debit card ending in XXXX. The discount will apply to whichever "Financial Institution" payment you choose. This in addition to any "Financial Institution" rewards programs you are already enrolled in. Please contact our customer service center at 1-800-555-3557 if you have any questions. Thank you for being a valued "Financial Institution" customer."

As another example, the text message may state "Hello Ms. Doe, based on your preferred notifications, it appears you are currently shopping at one of your favorite merchants, Jim's Marketplace on Riggs Rd. in Chandler, Ariz. "Financial Institution" is offering a 3% discount on your total purchase today if you utilize a "Financial Institution" payment method such as your "Financial Institution" credit card or "Financial Institution" debit card. The discount will apply to whichever "Financial Institution" payment you choose. This in addition to any "Financial Institution" rewards program you are already enrolled in. Based on your current financial health, we recommend using your "Financial Institution" credit card ending in XXXX for today's purchases. Please contact our customer service center at 1-800-555-3557 if you have any questions. Thank you for being a valued "Financial Institution" customer." In other embodiments, the recommendation may be sent using any other communication method, including an alert to the mobile device 110, an e-mail, or messaging delivered via the payment rewards client application 122 (e.g., the application that transmitted the location information).

Referring now to FIG. 6, a process 600 is shown for providing a recommended payment account, according to an example embodiment. The process 600 may be performed using the payment rewards system 100 shown in FIG. 1, including the mobile device 110, the financial institution computer system 130, and the merchant computer system 160 shown in FIG. 1, and all logic or other components of the systems and devices that are described in further detail herein. The process 600 may include determining a location of a user relative to a preferred merchant via the mobile device 110, recommending a provided payment account for the user to make a payment to the merchant based on a financial status of the user, and providing an incentive offer for the user to make the payment using the recommended payment account.

At 602 of the process 600, the beacon 170 broadcasts beacon discovery information. The beacon 170 may be operated independent of the merchant computer system 160, but intended to broadcast discovery information intended to indicate proximity to the preferred merchant (i.e., the merchant computer system 160). For instance, the beacon 170 may be located at or near the preferred merchant, including within the merchant location, but operating independently from the merchant computer system 160. In an exemplary embodiment, the beacon 170 includes a plurality of beacons related to a specific merchant but configured to transmit different information. For instance, the plurality of beacons may transmit discovery information indicating different areas of a merchant location or the location of different categories of products or services.

At 604, the mobile device 110 receives the discovery information from the beacon 170, or otherwise recognizes the presence of the beacon 170. In an example embodiment, the beacon 170 is only recognizable by the mobile device 110 when the mobile device 110 is within a predetermined distance of the beacon 170. When the beacon 170 is located within a location of the preferred merchant, receipt of the beacon discovery information at the mobile device 110 may indicate that the mobile device 110 (and thus the user) is proximate the preferred merchant and/or a specific product or service at the merchant location and should be provided with a recommendation for payment. In one embodiment, the mobile device 110 recognizes the presence of the beacon 170, triggering use of an associated application (e.g., the payment rewards client application 122). For instance, the application may be specific to a merchant and triggered based on beacon discovery information indicating that the mobile device 110 is at or near a location of the merchant.

At 606, the mobile device 110 transmits location information to the merchant computer system 160 based on recognition of the beacon 170 (i.e., receipt of the beacon discovery information). The mobile device 110 may also transmit user information along with the location information. For instance, once the beacon 170 is recognized by the mobile device 110, the mobile device 110 may transmit to the merchant computer system 160 any identifying and/or location information for the mobile device 110 and/or the user. In other embodiments, the merchant computer system 160 is configured to identify and/or locate the mobile device 110 based on transmission of the beacon discovery information by the mobile device 110.

At 608, the transmitted information is received by the merchant computer system 160 from the mobile device 110. The information may be transmitted specifically to the merchant computer system 160 by the mobile device 110. For instance, the user may intend to receive an incentive offer from the financial institution computer system 130 and/or the merchant computer system 160 prior to making a payment. The user may then cause the mobile device 110 to send location information to the merchant computer system 160 to notify any parties within the payment rewards system 100 that the user is proximate the preferred merchant. At 610, the merchant computer system 160 determines the location of the user based on the information transmitted by the mobile device 110. At 612, identifying and/or location information is sent to the financial institution computer system 130 by the merchant computer system 160.

At 614, the financial institution computer system 130 receives the user information from the merchant computer system 160. At 616, the financial institution computer system 130 determines that the user is proximate the preferred merchant and determines a recommended payment account and/or an incentive offer based on preferences of the user and the parties to the transaction. At 618, the financial institution computer system sends the recommended payment account and/or the incentive offer to the merchant computer system 160. At 620, the merchant computer system 160 receives the recommendation from the financial institution computer system 130. At 622, the merchant computer system 160 transmits the recommended payment account and/or the incentive offer to the mobile device 624. The merchant computer system 160 may determine a location (i.e., a network address) of the mobile device 110 based on the beacon information received from the mobile device 110. At 624, the mobile device 110 receives the recommendation.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions. Software implementations could be accomplished with standard programming techniques with rule based logic and other logic to accomplish the various connection steps, processing steps, comparison steps and decision steps.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media or share across multiple tiers of devices such as remote servers.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A computer-implemented method performed by one or more processors of a computer system, the method comprising:

receiving, by the computer system, global positioning system (GPS) location information from a mobile device with a GPS sensor;

receiving, by the computer system, beacon discovery information when the mobile device is within a first predetermined distance of the locator beacon, wherein the beacon discovery information was generated by a locator beacon within the first predetermined distance from the mobile device;

determining, by the computer system, a location of the mobile device relative to a merchant based on the GPS location information and the beacon discovery information;

based on the location of the mobile relative to the merchant, determining, by the computer system, that a payment account recommendation should be sent to the mobile device when the location of the mobile device is within a second predetermined distance of the merchant, the payment account recommendation including a recommended payment account for use in a payment transaction with the merchant;

generating, by the computer system, an incentive offer for using the recommended payment account for the payment transaction with the merchant, wherein the incentive offer comprises modifying one or more financial terms of the recommended payment account, including at least one of reducing an interest rate, increasing a credit limit, or modifying a payment schedule of the recommended payment account;

transmitting, by the computer system, the incentive offer and the recommended payment account to the mobile device.

2. The method of claim 1, wherein the incentive offer and the recommended payment account are transmitted to the mobile device based on the mobile device being proximate to the merchant for a predetermined duration of time.

3. The method of claim 1, wherein the incentive offer and the recommended payment account are transmitted to the mobile device based on the user being within a third predetermined distance of a product or service located at the merchant, and wherein the incentive offer is related to the product or service.

4. The method of claim 1, further comprising generating, by the computer system, a user profile based at least in part on past transactions involving the recommended payment account and input received from a user associated with the recommended payment account, wherein the incentive offer is generated based on the user profile.

5. The method of claim 4, further comprising generating, by the computer system, a merchant profile for the merchant based at least in part on past transactions involving the merchant and input received from the merchant, wherein the incentive offer is generated based on the merchant profile.

6. The method of claim 5, wherein the incentive offer is generated based on a pre-existing relationship between the merchant and the computer system.

7. The method of claim 4, wherein the recommended payment account is selected from a plurality of payment accounts, the method further comprising determining, by the computer system, based on the user profile, an expected financial impact to the user for making the payment using each of plurality of payment accounts, wherein the recommended payment account is selected based on the expected financial impact of each of the plurality of payment accounts.

8. The method of claim 4, wherein the input received from the user includes real-time information related to a contemplated purchase at the merchant.

9. The method of claim 1, wherein the recommended payment account is a new payment account provided by the computer system for use with the payment transaction.

10. A computer system, comprising a server system comprising a processor and instructions stored in non-transitory machine-readable media, the instructions configured to cause the server system to:

receive location information from a mobile device having a GPS sensor;

receive beacon discovery information when the mobile device is within a first predetermined distance of the locator beacon, wherein the beacon discovery information was generated by a locator beacon within the first predetermined distance from the mobile device;

determine a location of the mobile device relative to a merchant based on the location information and the beacon discovery information;

based on the location of the mobile device relative to the merchant, determine that a payment account recommendation should be transmitted to the mobile device when the location of the user is within a second predetermined distance of the merchant, the payment account recommendation including a recommended payment account for use in a payment transaction with the merchant;

generate an incentive offer for using the recommended payment account in the payment transaction, wherein the incentive offer comprises modifying one or more financial terms of the recommended payment account, including at least one of reducing an interest rate, increasing a credit limit, or modifying a payment schedule of the recommended payment account;

transmit the incentive offer and the recommended payment account to the mobile device.

11. The computer system of claim 10, wherein the incentive offer and the recommended payment account are transmitted to the mobile device based on the mobile device being proximate to the merchant for a predetermined duration of time.

12. The computer system of claim 10, wherein the incentive offer and the recommended payment account are transmitted to the mobile device based on the user being within a third predetermined distance of a product or service located at the merchant, and wherein the incentive offer is related to the product or service.

13. The computer system of claim 10, wherein the server system is further configured to generate a user profile based at least in part on past transactions involving the recommended payment account and input received from the user, wherein the incentive offer is generated based on the user profile.

14. The computer system of claim 13, wherein the server system is further configured to generate a merchant profile for the merchant based at least in part on past transactions involving the merchant and input received from the merchant, wherein the incentive offer is generated based on the merchant profile.

15. The computer system of claim 14, wherein the incentive offer is generated based on a pre-existing relationship between the merchant and the computer system.

16. The computer system of claim 13, wherein the server system is further configured to select the payment account from a plurality of payment accounts, wherein selecting the payment account comprises determining an expected financial impact to the user for making the payment using each of the plurality of payment accounts, wherein the recommended payment account is selected based on the expected financial impact of each of the plurality of payment accounts.

17. The computer system of claim 13, wherein the input received from the user includes real-time information related to a contemplated purchase at the merchant.

18. The computer system of claim 10, wherein the recommended payment account is a new payment account provided by the computer system for use with the payment transaction.

19. A computer-implemented method performed by one or more processors of a computer system, the method comprising:

identifying, by the computer system, a preferred merchant of a user with one or more payment accounts, wherein the preferred merchant is identified based on a user profile of the user, and wherein the user profile is based at least in part on past transactions of the user using the one or more payment accounts;

receiving, by the computer system, beacon discovery information when a mobile device of the user is within a first predetermined distance of the locator beacon, wherein the beacon discovery information was generated by a locator beacon proximate to the preferred merchant and within the first predetermined distance from the mobile device;

based on the location of the mobile device, determining, by the computer system, that the user is within a second predetermined distance from the preferred merchant;

determining, by the computer system, a recommended payment account from the one or more payment accounts for making a payment at the preferred merchant;

generating, by the computer system, an incentive offer for using the recommended payment account for making the payment, the incentive offer comprising modifying one or more financial terms of the recommended payment account, including at least one of reducing an interest rate, increasing a credit limit, or modifying a payment schedule of the recommended payment account; and transmitting the recommended payment account and the incentive offer to the mobile device when the location of the mobile device is within the second predetermined distance from the preferred merchant.

20. The method of claim 19, wherein the recommended payment account and the incentive offer are transmitted to the mobile device based on the mobile device being proximate to the preferred merchant for a predetermined duration of time.

\* \* \* \* \*